United States Patent [19]

Wenzel

[11] 4,209,309
[45] Jun. 24, 1980

[54] APPARATUS FOR THE SEPARATION OF ISOTOPES BY SEPARATING-NOZZLE PROCESS

[75] Inventor: Werner Wenzel, Spellen, Fed. Rep. of Germany

[73] Assignee: NUSTEP Trenndüsen Entwicklungs- und Patentverwertungsgesellschaft mbH & Co. KG, Essen, Fed. Rep. of Germany

[21] Appl. No.: 888,974

[22] Filed: Mar. 22, 1978

[30] Foreign Application Priority Data

Mar. 23, 1977 [DE] Fed. Rep. of Germany ....... 2712643

[51] Int. Cl.² .............................................. B01D 57/00
[52] U.S. Cl. ......................................... 55/269; 55/17; 55/277
[58] Field of Search ................... 55/17, 173, 267, 269, 55/277, 342, 69; 62/401, 402, 403

[56] References Cited

U.S. PATENT DOCUMENTS

| 2,801,830 | 8/1957 | Frisch | 55/267 X |
| 2,925,720 | 2/1960 | Dorsey et al. | 55/173 X |
| 2,935,007 | 5/1960 | Mercatanti | 55/269 |
| 2,950,778 | 8/1960 | Boettcher et al. | 55/17 |
| 3,823,559 | 7/1974 | Foret | 62/401 X |
| 4,113,448 | 9/1978 | Haarhoff et al. | 55/17 |

FOREIGN PATENT DOCUMENTS

2542296 3/1977 Fed. Rep. of Germany ............. 55/17

*Primary Examiner*—Robert H. Spitzer
*Attorney, Agent, or Firm*—Karl F. Ross

[57] ABSTRACT

Isotopes are separated, e.g. uranium enrichment is carried out, by the separating-nozzle process in an apparatus which comprises a plurality of separating-nozzle units with respective skimmer diaphragms and nozzles, coolers ahead of these units and gas passages for supplying the isotope gas mixture. The devices are functionally integrated into a separation cascade with a vacuum-tight vessel having a circular plan configuration. The vessel is subdivided by partitions into sectors for the individual stages of the cascade. According to the invention the vessel has a spheroidal shape and is stiffened by the radial partitions. The vessel is set upon four plate-like supports arranged in a cruciform pattern with the separating units and coolers only being located in the respective sectors while the compressors are arranged in four structurally independent compressor assemblies disposed below the vessel in regions bracketed by the supports.

3 Claims, 5 Drawing Figures

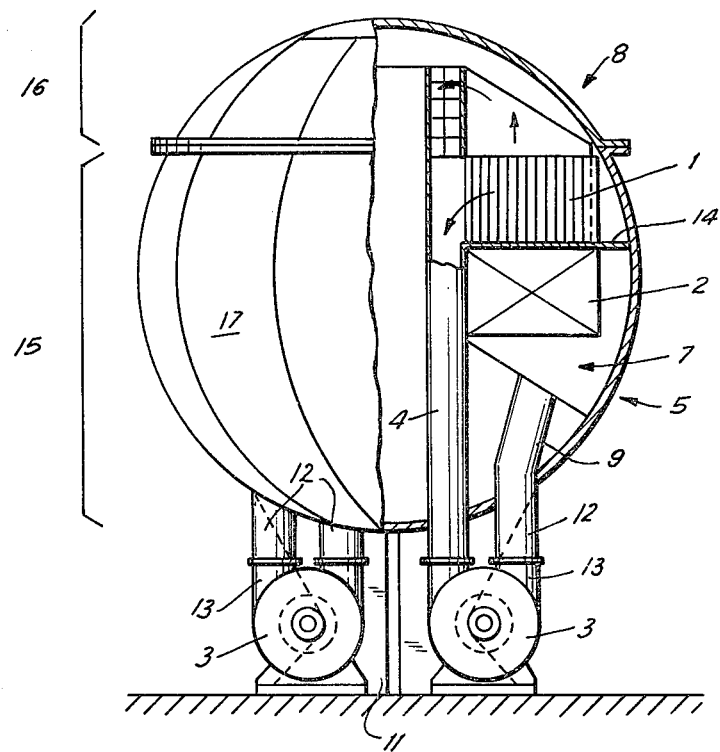
FIG. 3
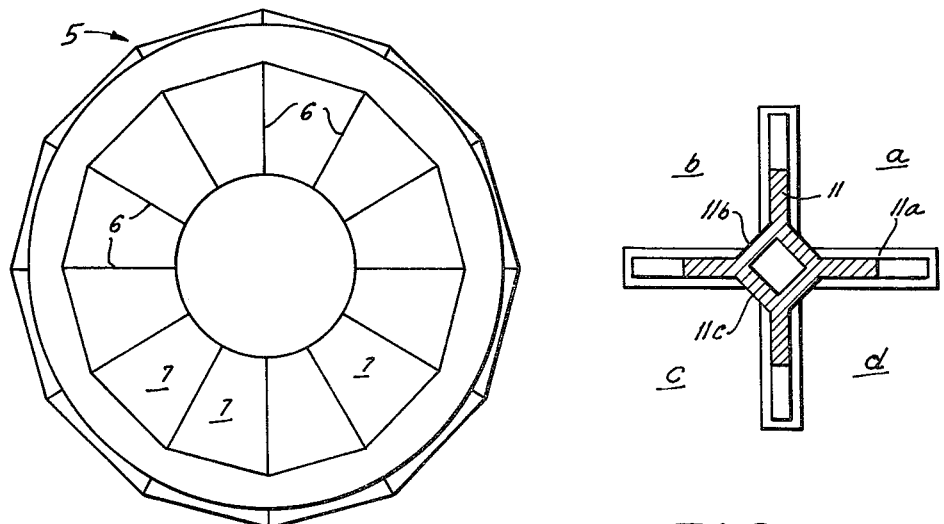
FIG. 4
FIG. 5

APPARATUS FOR THE SEPARATION OF ISOTOPES BY SEPARATING-NOZZLE PROCESS

CROSS-REFERENCE TO RELATED APPLICATION

This application is related to my commonly assigned copending application Ser. No. 725,493, filed Sept. 22, 1976, now U.S. Pat. No. 4,093,436.

FIELD OF THE INVENTION

The present invention relates for an apparatus for isotope separation by the separating-nozzle process and, more particularly, to uranium enrichment apparatus which has an integrated arrangement of the various devices associated with this process.

BACKGROUND OF THE INVENTION

The separation of isotopes in the gas phase and, especially, uranium isotopes for uranium enrichment, based upon different molecular weights and/or different kinetic cross sections of the molecules of the isotopes to be separated in the gas phase, can be carried out by the separating-nozzle process well documented in the literature and described in the aforementioned copending application and the art cited therein.

The gas mixture, in this system, is forced with or without a carrier (low-molecular-weight gas) through slit-like nozzles, the outflow of which is intercepted by skimmer-diaphragm arrangements which separate the molecules of the heavier isotope from those of the lighter isotope.

The assemblies of such nozzles and associated skimmer diaphragms are referred to hereinafter as separating-nozzle units or, more generally, as separating units.

As described, inter alia, in the aforementioned copending application, it is common practice to feed each such separating-nozzle unit with a respective compressor and to connect the unit in cascade with other units for maximum resolution or separation efficiency. The latter application, moreover, describes arrangements wherein at least part of the compression heat is removed from the gas by a cooler upstream of each unit.

Separating-nozzle units, their principles and the various auxiliary devices (e.g. compressors) used with these units, are described in the following publications:

U.S. Pat. No. 3,362,131;
U.S. Pat. No. 3,708,964;
U.S. Pat. No. 3,877,892;
German Pat. No. 1,052,955;
German Pat. No. 1,096,875;
German Pat. No. 1,198,328;
German Pat. No. 2,031,687;
CHEMIE-INGENIEUR-TECHNIK, Vol. 29, pp. 365 ff. (1957);
CHEMIE-INGENIEUR-TECHNIK, Vol. 39, pp. 1 ff. (1967);
ATOMWIRTSCHAFT/ATOMTECHNIK, Vol. 13, pp. 359 ff. (1968).

As described in the aforementioned application, a plurality of separating-nozzle units can be functionally integrated into a separating cascade with the aid of a vacuum-tight vessel having a circular-plan configuration and internally subdivided by radial partitions into sectors for the respective cascade stages. The gas ducts can be arranged centrally in the sectors in the upper part of the vessel and as connecting passages between the compressors, the coolers and the central gas passages.

Prior to this development and in most applications of the process, the apparatus was also functionally integrated into a separation cascade although the devices of the latter were usually not structurally integrated. The common practice was to provide the separating stages next to one another and to connect them by gas ducts which could be provided with enveloping or surrounding ducts to limit the possibility of escape of gas in the event of a failure in the system. This had various disadvantages especially with respect to the large spatial requirements of a row of stages, the distances between such stages made necessary by the disposition of the compressors between them, and the bulk of individually housed separating-nozzle units.

This resulted in:

(a) long supply and feed lines for gas, cooling water and electrical energy;
(b) a large number of control, monitoring and measuring units and locations;
(c) high instrumentation and monitoring costs; and
(d) high capital cost, expensive transportation requirements for the numerous units and subassemblies, and considerable assembly and erection cost at the plant site.

Since all units and subassemblies of the apparatus had to be sealed vacuum-tight against atmospheric pressure, the numerous failure-prone weld seams necessary to this end created problems and required high weld-testing costs.

All of these disadvantages were reflected in the high capital and operating cost of uranium enrichment by the separation-nozzle process.

While the system described in my prior above-identified application was free from the last-mentioned disadvantages, work with this system has shown that it is capable of improvement. More particularly, the system of that application is characterized by an upright cylindrical column with a bottom portion, middle portion and upper portion. Radial partitions subdivide the interior of the column into sectors in the region of the central portion of the column and into chambers above and below these sectors. The arrangement was so constructed that the separating-nozzle units were located at outer portions of the sectors, the coolers in chambers below the separating element units and the compressors in the bottom portion of the column. The gas passages ran, on the one hand, centrally to the sectors as well as in the upper portion of the column and, on the other hand, as connecting ducts between the compressors, the coolers and the central gas passages. This has been found to be capable of simplification especially when large gas throughputs are desired.

OBJECT OF THE INVENTION

It is thus the principal object of the present invention to provide an improved cascade-type separating-nozzle apparatus for uranium enrichment which extends the principles of the aforementioned copending application and is particularly suitable for the handling of large gas throughputs.

SUMMARY OF THE INVENTION

The invention constitutes an improvement upon the apparatus of the aforementioned copending application which comprises, as has been noted previously, a plurality of separating-nozzle units connected in cascade for uranium enrichment or, more generally, isotope separation in accordance with the separating-nozzle process. Ahead of each of these separating-nozzle units is a gas cooler and, connected to each other, is a compressor. The separating units and coolers are received in a vacuum-tight vessel having a circular plan configuration and the interior of the vessel is subdivided by radial partitions into sectors receiving the individual separating cascade stages.

According to this invention, the vessel is constituted as a spheroidal receptacle which is internally stiffened by the radial partitions. The spheroidal vessel is, in turn, mounted upon four plate-like supports disposed in a cruciform array so that the four quadrants defined by these supports form spaces bracketed by the arms of the cruciform structure.

According to an essential feature of the invention, only the separating-nozzle units and the coolers are disposed within respective sectors of the spheroidal vessel while the compressors are disposed in four structurally independent compressor units or aggregates and are received respectively in the four quadrants defined by the aforementioned support so as to be bracketed by the arms thereof.

According to a preferred embodiment of the invention, the assembly is so constructed that the central gas passage and the connecting passages between the compressors and the coolers are connected to the spheroidal vessel or enter or exit therefrom through fittings built onto the spheroidal vessel and lying all at the same level. The compressor units, in turn, are provided with connecting fittings which are joined to the connecting fittings of the spheroidal vessel, e.g. flanged together, as is required for the functional connection of the units, compressors and coolers in the desired cascade relationship. Upon release of the screw-and-nut flange connections, the compressors can easily be removed for servicing or replacement.

It is an important advantage of the present invention that the spheroidal vessel, because of its configuration, can be relatively light and of small wall thickness, even for the handling of large gas throughputs, since the radial partitions not only act as subdividers for the sectors but also have a stiffening function.

For further stiffening of the vessel, the latter can be provided with horizontal or inclined stiffening intermediate bottoms or horizontal or substantially horizontal intermediate plates.

In order that the vessel can be readily accessible, it can be provided with ordinary closable manholes, windows or the like.

It has also been found to be advantageous to form the spheroidal vessel as a two-part body and to make the upper portion as a removable dome. The lower portion, from which the dome can be removed, can occupy two thirds to three quarters of the total height so that the dome begins only above the separating-nozzle units.

Because of the aforedescribed stiffening, the spheroidal vessel can have a shell which can be assembled from planar relatively thin sheet-metal sections which can be simply curved to the configuration of the ball and joined together along their edges without concern for static disadvantages. The planar sheet sections can then correspond, in their width measured along the periphery of the ball, to the width of the individual sectors.

The invention thus provides that the individual compressor assemblies (four in number) can be disposed outside the retaining vessel which is vacuum-tight and disposed below the latter so as to be readily maintained or easily replaceable or accessible. Since the spheroidal vessel rests upon a cruciform support, the latter defines spaces, i.e. the four quadrants mentioned previously, which can accommodate the compressors. The result is an especially compact and enclosed unit.

BRIEF DESCRIPTION OF THE DRAWING

FIG. 3 is an equatorial section through one half of the spherical vessel of the present invention, the other half being shown in vertical elevation;

FIG. 4 is a longitudinal section through the vessel; and

FIG. 5 is a cross-sectional view taken along the line V—V in FIG. 2.

SPECIFIC DESCRIPTION

Figure 1:
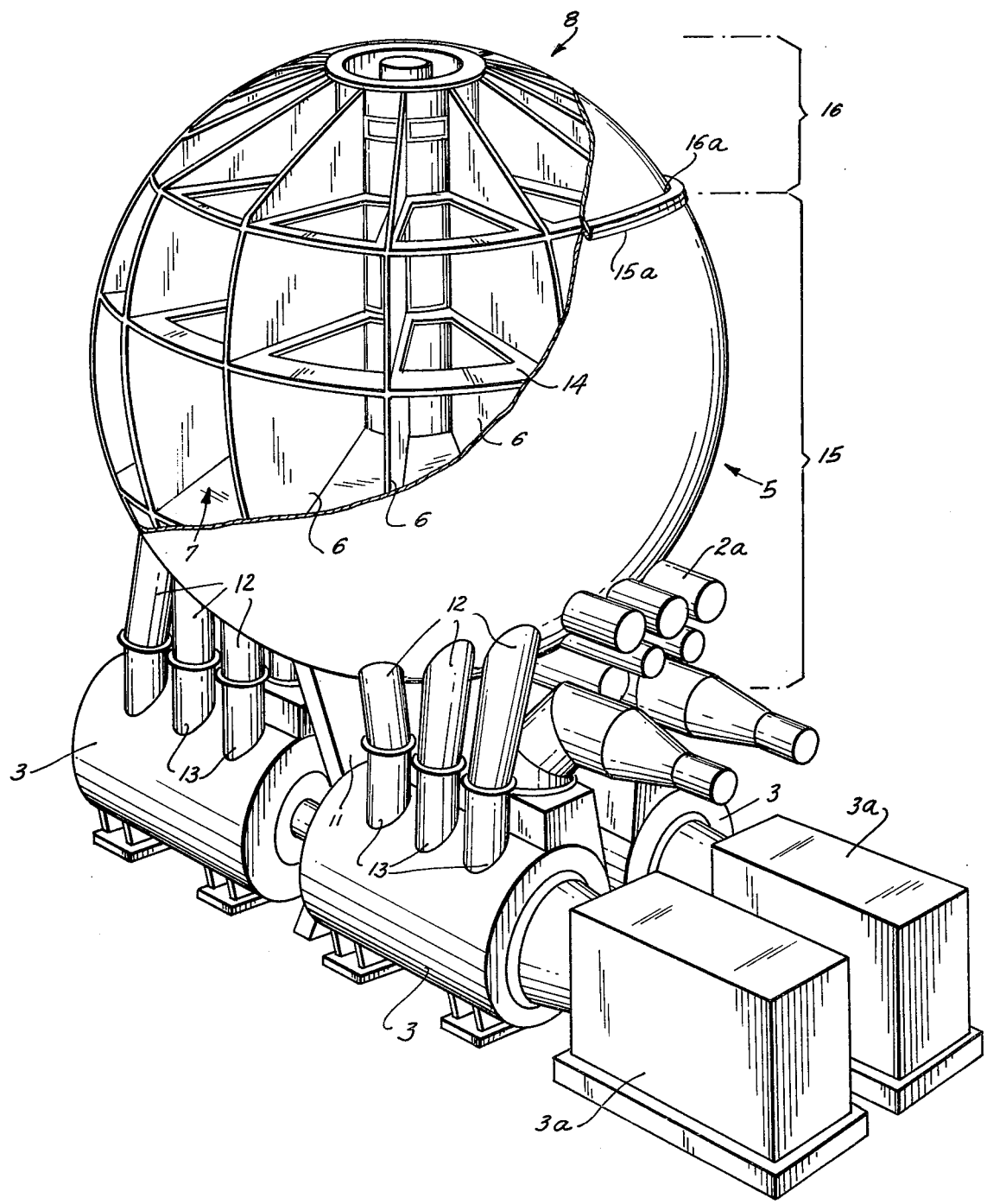
FIG. 1 is a perspective view of a uranium-enrichment installation according to the invention with the spherical vessel partly broken away.

The apparatus of the present invention comprises twelve separating-nozzle units 1 with coolers 2 connected upstream of the separating-nozzle units 1, compressors 3 and gas passages 4. These gas ducts 4 effect the functional integration of the separating-nozzle units 1 to a separating cascade of conventional flow pattern as described in the aforementioned publications.

The apparatus in addition comprises a vacuum-tight vessel 5 of circular plan configuration which is subdivided by radial partitions 6 into sectors 7 for the individual cascade stages. This is most readily apparent from FIG. 3.

The gas ducts 4 run, on the one hand, centrally in the sectors 7 (see FIG. 3) and into the upper portion of the container at which the gases are distributed to the cascade stages as described in the aforementioned copending application. The ducts are also provided as connecting ducts 9 between the compressors 3, the coolers 2 and the central gas passage or duct 4 of the respective sectors.

According to the invention, the container 5 is formed as a spheroidal receptacle which is stiffened by the partitions 6. The spherical receptacle 5 is set upon a centrally disposed cruciform support 11 which rests upon the ground or a concrete base plate or foundation 10. This has been shown particularly in FIGS. 2 and 5. The cruciform support (FIG. 5) is made up of four plates disposed in a cruciform pattern and bridged by corner plates 11b which are welded to the plates 11 at weld seams 11c. The plates 11 may be provided with outwardly extending flanges along their bottom edges to form feet. The cruciform support defines quadrants a, b, c and d which constitute spaces within which the compressors can be disposed as will be apparent hereinafter.

The sectors 7 receive only the separating-nozzle units 1 and the respective coolers 2.

The compressors 3, in accordance with an essential feature of the invention, are formed in four structurally independent compressor units which are disposed in the respective quadrands a–d directly below and within the circular plan outline of the receptacle 5 upon the base or ground 10.

The central gas duct 4 and the connecting ducts 9 between the compressors 3 and the coolers 2 are formed with connecting fittings 12 terminating in a common plane P (FIG. 3) in flanged ends. The compressors 3, in addition, have upstanding fittings 13 which also terminate in flanged ends so that the two sets of fittings can be connected together by conventional flange techniques, i.e. the flanges are bolted sealingly together.

Figure 2:
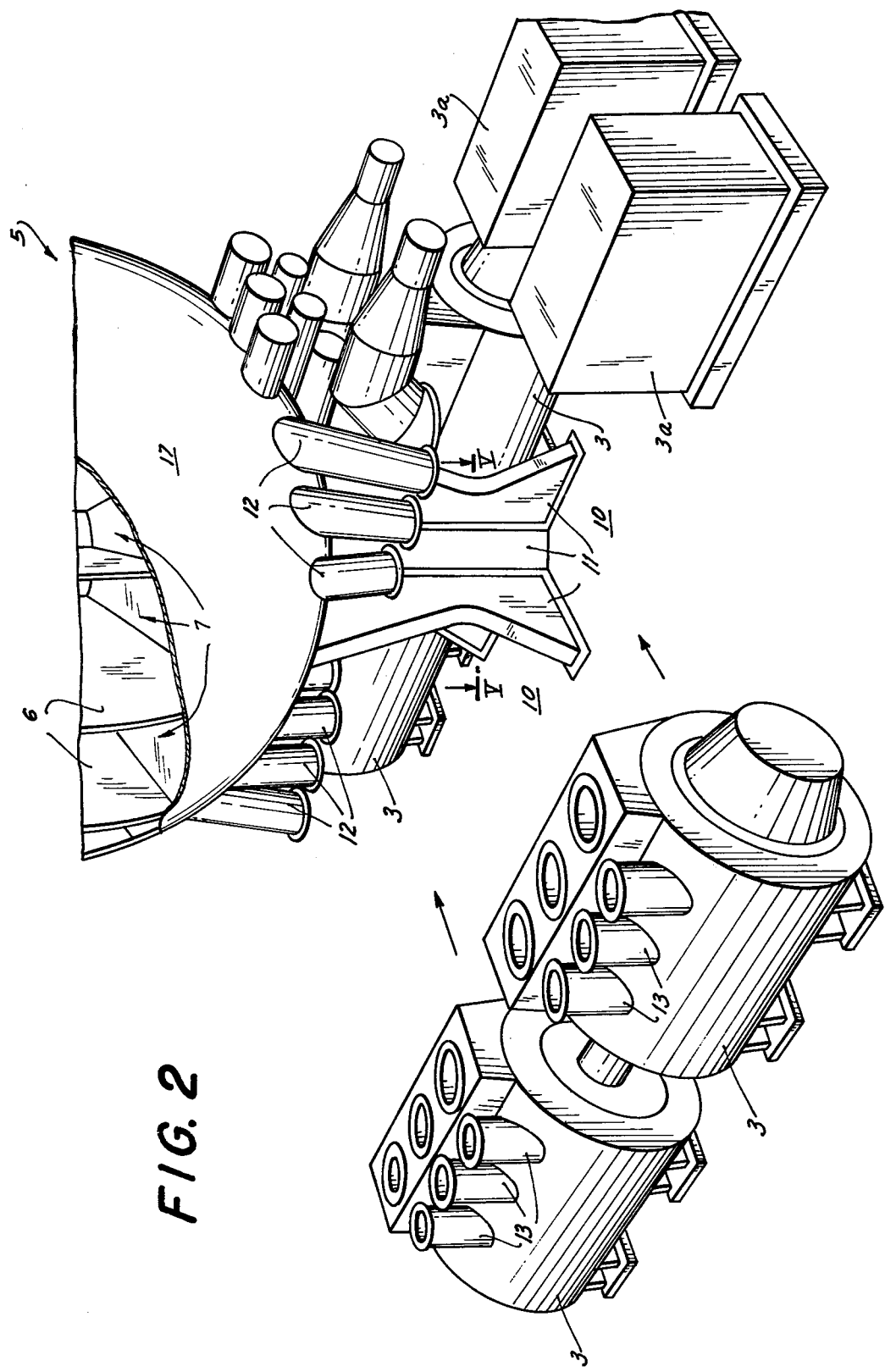
FIG. 2 is a view similar to FIG. 1 showing two of the compressors removed.

This permits, as a comparison of FIGS. 1 and 2 will show, the selective removal of the compressor sets 3 or their replacement for maintenance or repair. The compressors can be connected, when in place, to the respective drive units 3a.

The spherical vessel 5 in the embodiment illustrated and in accordance with a preferred embodiment of the invention, is provided internally with horizontal or slightly inclined stiffening webs or plates 14, here shown to have a sectoral frame configuration and to be welded to the partitions and to the wall of the vessel 5 (see FIG. 1).

The vessel comprises a statically stable lower portion 15 having an upper flange 15a and a dome 16 constituting the upper portion 8 of the vessel. The dome 16 is likewise provided with a flange 16a which can be bolted sealingly to the flange 15a. To permit access to the interior of the vessel for maintenance or repair, the vessel can be provided with manholes if desired. However, it may be merely necessary to remove the domed cover 16 for this purpose. If manholes are desired, they can be provided at any convenient location along the shell of the vessel, being sealingly closed by conventional covers.

The vessel 5 is provided with a shell 17 which can be assembled from doubly courved sheet-metal sections or, as is preferred, from planar sheet-metal sections which are simply curved and welded together along their edges.

The width of the sheet-metal sections corresponds to the arc length of the individual sectors 7 so that these sheet-metal sections can be seamed along the edges of the radial partitions 6.

In accordance with conventional separating-nozzle techniques, the compressors 3 compress the gas mixture which is cooled to remove the heat of compression by respective coolers 2 which can be supplied with cooling water through fittings 2a opening into the vessel. The highly compressed gas mixture then flows through the first of the separating-nozzle units and the light fraction is discharged in the direction of the radial arrow while the heavy fraction emerges in the direction of the axial arrow from the separating-nozzle unit. The light fraction is combined with the respective heavy fraction at the inlet of the next compressor while the heavy fraction is mixed with gas in an annular gas distributor in accordance with the principles of the aforedescribed application and cascade operation of the separating nozzle system.

I claim:

1. An apparatus for uranium isotope enrichment by the separating nozzle process, comprising:
    a spherical vacuum-tight circular-plan vessel constituted of an upwardly open lower portion and a dome cover surmounting said lower portion, said vessel being formed internally with a plurality of vertical radial partitions subdividing the vessel into a plurality of sectors, and at least one transverse partition subdividing each sector into an upper compartment and a lower compartment, said partition stiffening said vessel;
    a central cruciform support comprised of vertical plates joined at the vertical axis of said vessel and supporting said vessel beneath the lower portion, said plates defining four quadrant-shaped spaces below and within the outline of said vessel;
    respective coolers received in lower compartments of said sectors;
    respective separating-nozzle units received in upper compartments of said sectors;
    four compressor units independent of one another and each received in a respective one of said spaces;
    duct means connecting said compressor units, respective ones of said coolers and respective separating nozzles in cascade to effect isotope separation said partitions stiffening said lower portions into a self-supporting structure; and
    means detachably connecting said dome to said structure for enabling removal of said dome to afford access to said separating nozzle units in said upper compartments.

2. The apparatus defined in claim 1 wherein said radial partitions reach inwardly to a central vertical gas passage forming part of said duct means, said duct means further comprising fittings turned downwardly from said vessel and terminating in a common horizontal plane, said compressor units being formed with upwardly turned fittings removable connected to and registrable with the downwardly turned fittings.

3. The apparatus defined in claim 1 wherein said vessel has a shell formed from bent sheet-metal sections contiguously adjoining one another.

* * * * *